United States Patent
Hoshizawa et al.

(10) Patent No.: US 7,782,729 B2
(45) Date of Patent: Aug. 24, 2010

(54) DIGITAL DATA RECORDING METHOD AND DATA RECORDING/REPRODUCING APPARATUS

(75) Inventors: Taku Hoshizawa, Kawasaki (JP); Atsushi Fuchiwaki, Yokohama (JP)

(73) Assignee: Hitachi Ltd., Tokyo (JP)

( * ) Notice: Subject to any disclaimer, the term of this patent is extended or adjusted under 35 U.S.C. 154(b) by 980 days.

(21) Appl. No.: 11/494,624

(22) Filed: Jul. 28, 2006

(65) Prior Publication Data

US 2007/0121447 A1    May 31, 2007

(30) Foreign Application Priority Data

Nov. 30, 2005    (JP)    .............................. 2005-344877

(51) Int. Cl.
*G11B 7/00*    (2006.01)
(52) U.S. Cl. ................ 369/53.35; 369/53.1; 369/53.15; 369/53.31; 369/47.14; 369/53.36
(58) Field of Classification Search ................ 369/30.3, 369/44.33, 53.15–53.17, 53.24, 275.3, 47.14, 369/53.31, 53.35, 53.36
See application file for complete search history.

(56) References Cited

U.S. PATENT DOCUMENTS

| | | | |
|---|---|---|---|
| 5,237,553 A * | 8/1993 | Fukushima et al. | ...... 369/53.17 |
| 2005/0185524 A1* | 8/2005 | Park et al. | .................. 369/30.3 |
| 2005/0259547 A1* | 11/2005 | Hwang et al. | ............. 369/53.21 |
| 2009/0300466 A1* | 12/2009 | Yoshimura | .................. 714/769 |

FOREIGN PATENT DOCUMENTS

| | | |
|---|---|---|
| JP | 11-144381 | 5/1999 |
| JP | 11-242565 | 9/1999 |
| JP | 2000-040306 | 2/2000 |
| JP | 2001-006172 | 1/2001 |
| JP | 2002-324363 | 11/2002 |
| JP | 2005-160060 | 6/2005 |
| JP | 2005-302143 | 10/2005 |

OTHER PUBLICATIONS

Japanese Office Action issued in Japanese Patent Application No. JP 2005-344877 dated Apr. 14, 2009.

* cited by examiner

*Primary Examiner*—Wayne R Young
*Assistant Examiner*—Dionne H Pendleton
(74) *Attorney, Agent, or Firm*—McDermott Will & Emery LLP

(57) ABSTRACT

The object of the present invention is to curtail the time required from the receipt of a demand for certification processing of a rewritable optical disk from an apparatus of the higher order to the receipt of a demand for recording processing. In order to achieve this object, a digital data recording method for recording on a rewritable optical disk includes certification processing including a first step of recording certification data for the certification processing on the optical disk, a second step of recording user data different from the certification data on the optical disk after the first step, and a third step of reproducing the data recorded in the first step or the second step after the second step, and switches the certification processing based on the result reproduced in the third step.

16 Claims, 14 Drawing Sheets

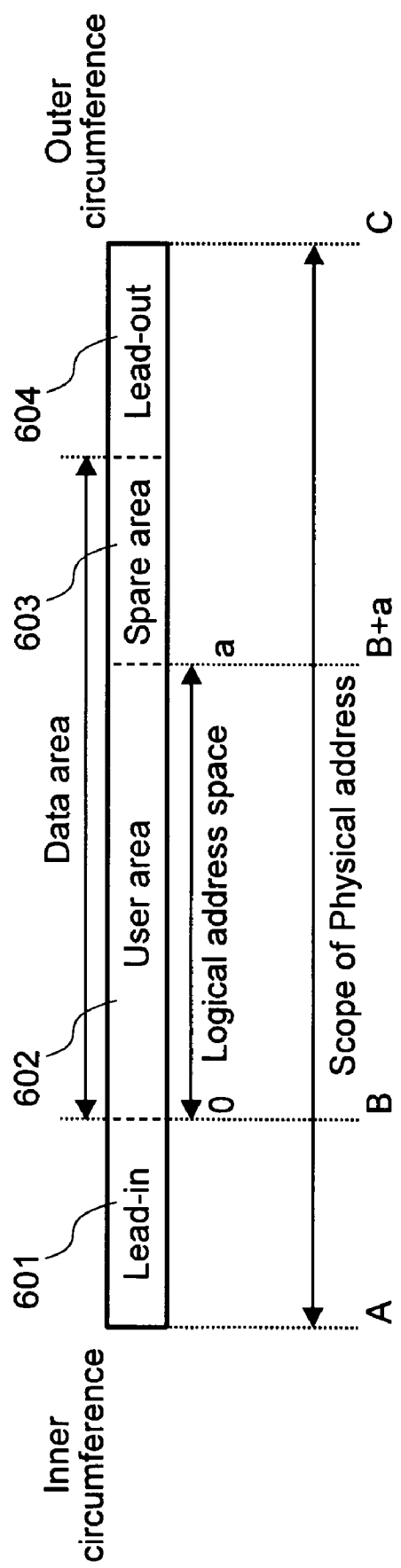

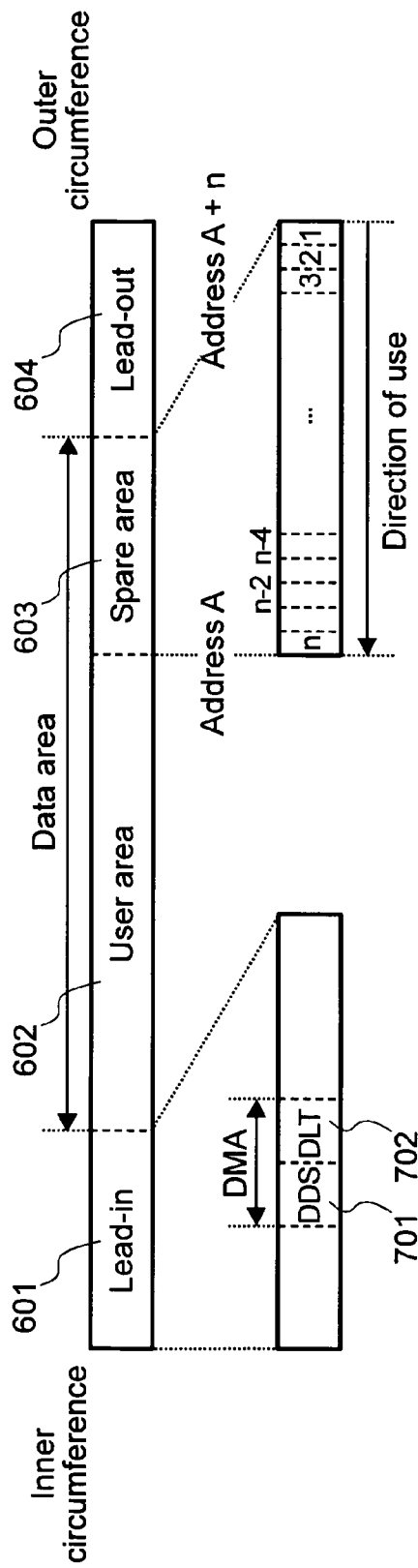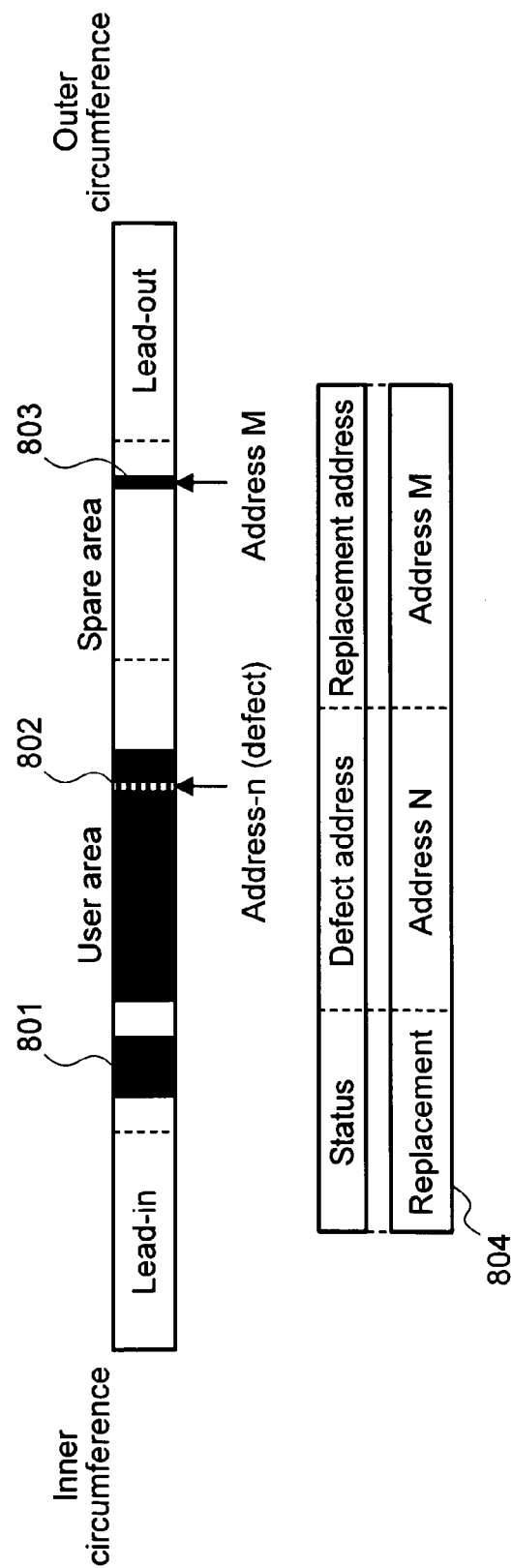

FIG.9

| Byte number | Stored data |
|---|---|
| 0-1 | Identifier = "DS" |
| 2-3 | DDS update counter |
| 4-7 | Valid DLT address |
| 8-11 | Space area size |
| 12-15 | (Reserve) |
| 16-19 | Certification status |
| 20-23 | Certified address |
| 24-32767 | (Reserve) |

| Byte number | Stored data |
|---|---|
| 0-1 | Identifier = "DL" |
| 2-3 | DLT update counter |
| 4-7 | "Reserve" |
| 8-11 | Number of entries in the DL |
| 12-15 | "Reserve" |
| 16-23 | DL1 |
| 24-31 | DL2 |
| ⋮ | |
| 32760-32767 | DL4094 |

702

804

DIGITAL DATA RECORDING METHOD AND DATA RECORDING/REPRODUCING APPARATUS

CLAIM OF PRIORITY

The present application claims priority from Japanese application serial no. JP2005-344877, filed on Nov. 30, 2005, the content of which is hereby incorporated by reference into this application.

BACKGROUND OF THE INVENTION

1. Field of the Invention

The present invention relates to a digital data recording technology, in particular to a recording/reproducing technology for recording digital data on rewritable optical disks.

2. Description of the Related Art

An operation called "certification" has so far been implemented to improve the reliability of recording information on rewritable optical disks such as DVD-RAM and the like. This operation is carried out in order to improve the reliability of recording information by managing the scratches, stains, dusts, finger prints and the like on the recording surface of optical disks as described in the Japanese Patent Laid Open Publication 2001-6172 as follows: "In this 'certify' mode, defects on an optical disk are certified. In this mode, the data on the optical disk are actually read out from the inner circle to the outer perimeter of the optical disk to detect the defects that have developed on the optical disk. And upon discovery of a defect, a replacement sector in the place of this defect is allocated to a spare area set in advance on the optical disk. This replacement sector is allocated differently depending on the specification of each optical disk. However, the information is written as a defect list at the end of the lead-in area located on the inner circumference side of the optical disk or at the top of the lead-out area on the outer circumference side. At the same time, the defect list is registered in a memory located in the recording apparatus." Incidentally, in a certification operation it is necessary that, after data are recorded on the optical disk, dummy data and the like different from the user data be recorded once on the optical disk by reproducing the data of the optical disk. Here, much time is necessary to record dummy data on the whole optical disk. Accordingly, it is proposed that certification and user data be recorded at the same time as described in the Japanese Patent Application Laid Open Hei 11-242565 as follows: "Therefore, the object of the present invention is to provide an initializing method of rewritable recording mediums and an initializing apparatus suitable for recording mediums of a large capacity. Another object of the present invention is to provide an initializing method of rewritable recording media that can be initialized while data are recorded without devoting any special time for the initialization of the whole recording medium and wherein the reliability of the recorded data can be secured and an initializing apparatus capable of performing the processing. Another object of the present invention is to provide an initializing method and an initializing apparatus for initializing rewritable recording mediums on which data can be recorded even if the whole area of the same is not initialized."

SUMMARY OF THE INVENTION

However, what is assumed as the user data for accepting the demand for recording from the host computer at the same time as the execution of certification in Japanese Patent Laid Open Publication Hei 11-242565 is not real-time streaming data but is limited to the normal user data. Lately, there is a rising demand for accepting the demand for recording not only unreal-time normal user data but also real-time streaming data at the same time as the execution of certification.

Therefore, the object of the present invention is to provide a method of recording digital data and a recording/reproducing apparatus capable of accepting the recording demand made by the host computer for recording the normal user data and streaming data at the same time as the execution of certification.

The objects of the present invention can be achieved by the following subparagraphs (1) and (2).

(1) A method of recording digital data on a rewritable optical disk including certification processing including a first step of recording certification data for the certification processing on the optical disk, a second step of recording user data different from the certification data on the optical disk after the first step, a third step of reproducing the data recording in the first step or the second step after the second step, and switching the certification processing based on the result reproduced in the third step.

(2) A digital data recording/reproducing apparatus for executing certification processing on a rewritable optical disk including a laser diode for emitting laser beams, a laser diode driving unit for driving the laser diode, and a controlling unit for controlling the laser driving unit, wherein the controlling unit controls the laser diode to perform the first step of recording the certification data for the certification processing on the optical disk, the second step of recording user data different from the certification data on the optical disk after the first step, and a third step of reproducing the data recording in the first step or the second step after the second step, and switching the certification processing based on the result reproduced in the third step.

The application of the technology of the present invention enables to curtail the time required from accepting a demand for certification processing of rewritable optical disk from an apparatus of the higher order to accepting a demand for processing including demand for recording processing of streaming data.

BRIEF DESCRIPTION OF THE DRAWINGS

FIG. 6 is a descriptive illustration showing the correspondence between the logical address space and the physical address of an optical disk;

FIG. 7 is a descriptive illustration showing a rewritable optical disk having a defect control function;

FIG. 8 is a descriptive illustration showing the replacement processing and the DL of an optical disk by the defect control function;

FIG. 9 is a descriptive illustration showing the structure of DDS;

FIG. 10 is a descriptive illustration showing the structure of DLT;

DETAILED DESCRIPTION OF THE PREFERRED EMBODIMENTS

Figure 1:
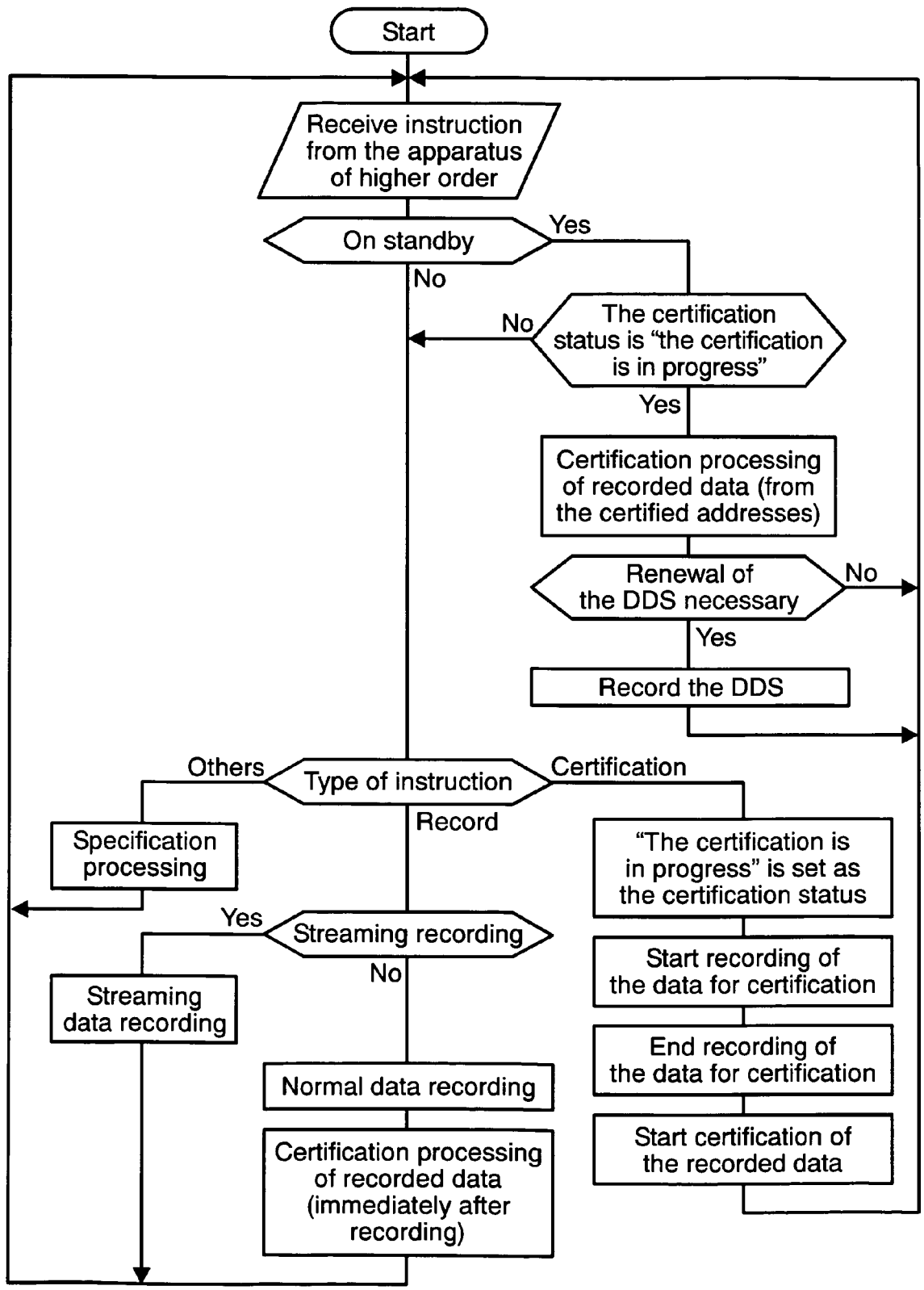
FIG. 1 is a flowchart showing the certification processing operation of the present invention.

In the first place, we will show the main codes used in the drawings.

11. Optical disk, 2. Optical head, 21. Light spot, 22. Light beam, 23. Objective lens, 24. Collimator lens, 25. Laser, 26. Detector, 27. Detector, 28. Beam splitter, 29. Hologram element, 31. Lens actuator, 41. Signal reproducing block, 51. Laser driver, 61. Servo circuit, 7. Microprocessor, 8. Memory, 9. Apparatus of the higher order.

We will describe below the embodiments of the present invention with reference to drawings.

Incidentally, in this embodiment we will describe the present invention based on a DVD-RAM specified by the ECMA-272. However, it is possible to obtain the effect of the present invention not only by using a DVD-RAM but also by using any rewritable recording mediums.

As an example of recording and reproducing system of digital data from information recording mediums, a recording/reproducing system of optical disks such as CD and DVD is mentioned. We will describe below the structure and the recording/reproducing operation of this optical disk recording/reproducing system with reference to FIG. 4 and FIG. 5.

Figure 4:
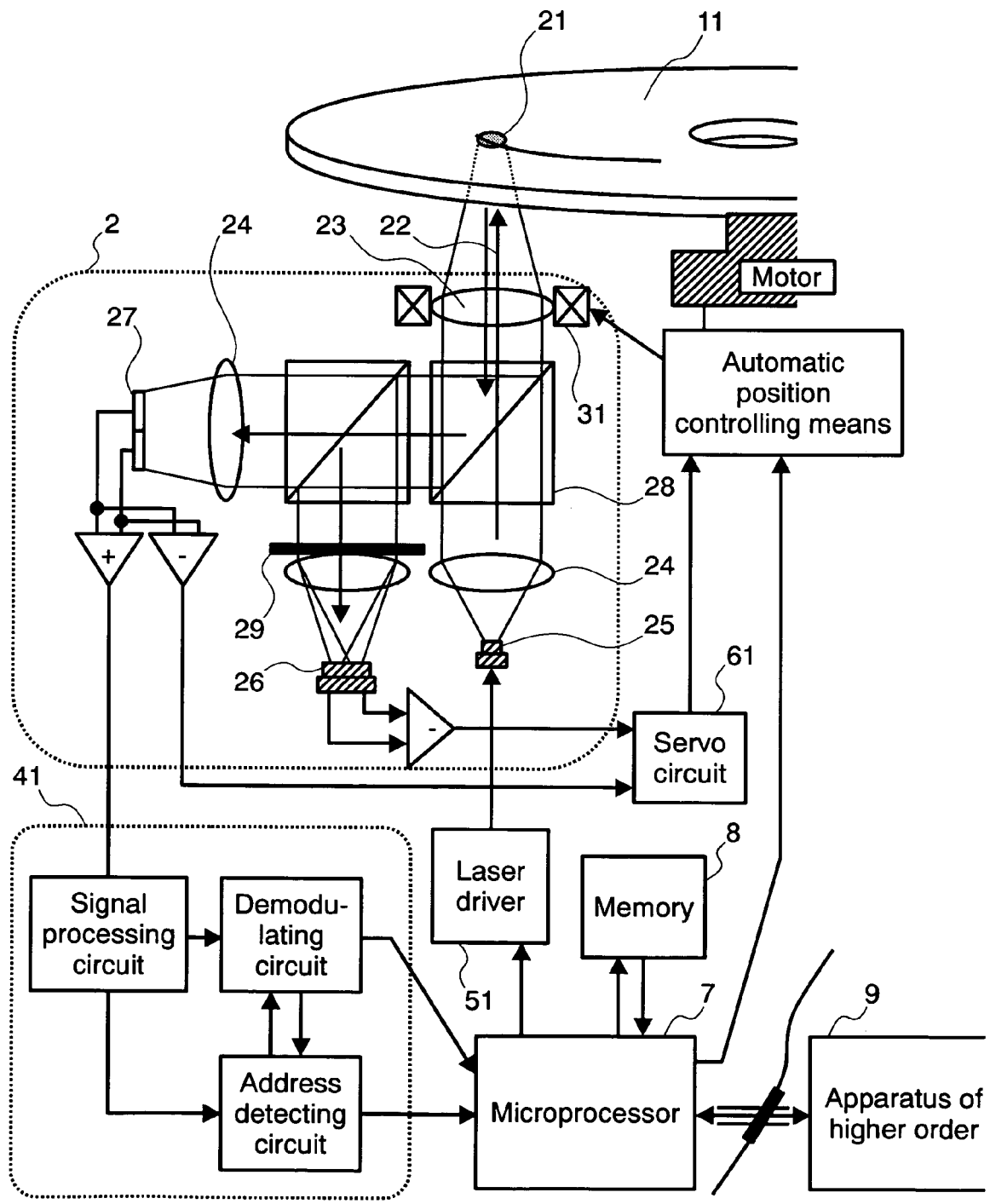
FIG. 4 is a descriptive illustration showing the structure of an optical disk recording/reproducing apparatus.

FIG. 4 shows the structure of an optical disk recording/reproducing system. Light emitted from a laser source 25 forming part of an optical head 2 (with a wavelength of 650 nm in the case of DVD) is collimated through a collimator lens 24 to form nearly parallel light beams 22. The light beams 22 are emitted through the objective lens 23 on an optical disk 11 to form a spot 21. Then the light beams 22 are guided to a servo detector 26 or a signal detector 27 through a beam splitter 28 and hologram elements 29. The signals coming from various detectors are added or deducted to become servo signals such as tracking error signals or focusing error signals and are then inputted into a servo circuit 61. The servo circuit 61 controls the driving unit 31 of the objective lens 23 and the position of the whole optical head 2 based on the tracking error signals or the focusing error signals that have been acquired, and adjusts the position of the light spot 21 in the target recording/reproducing area. The adding signals of the detector 27 are inputted into the signal reproducing block 4. The input signals are filtered and their frequencies are equalized by the signal processing circuit and then are digitalized. The digital signals that have been digitalized are processed by the address detecting circuit and the demodulating circuit. The microprocessor 7 calculates the positions of the light spots 21 on the optical disk 11 based on the address signals detected by the address detecting circuit and controls the automatic positioning means to position the optical head 2 and the light spot 21 in the target recording/reproducing area.

When the command of the apparatus of the higher order 9 is given to the optical disk recording/reproducing apparatus in the form of a record, the microprocessor 7 receives user data from the apparatus of the higher order 9, stores the same in the memory 8, and controls the automatic position controlling means to position the light spot 21 in the target memory area. After confirming that the light spot 21 has been positioned normally in the recording area by an address signal received from the signal reproducing block 41, the microprocessor 7 records the user information stored in the memory 8 in the target recording area by controlling the laser driver and the like.

Figure 5:
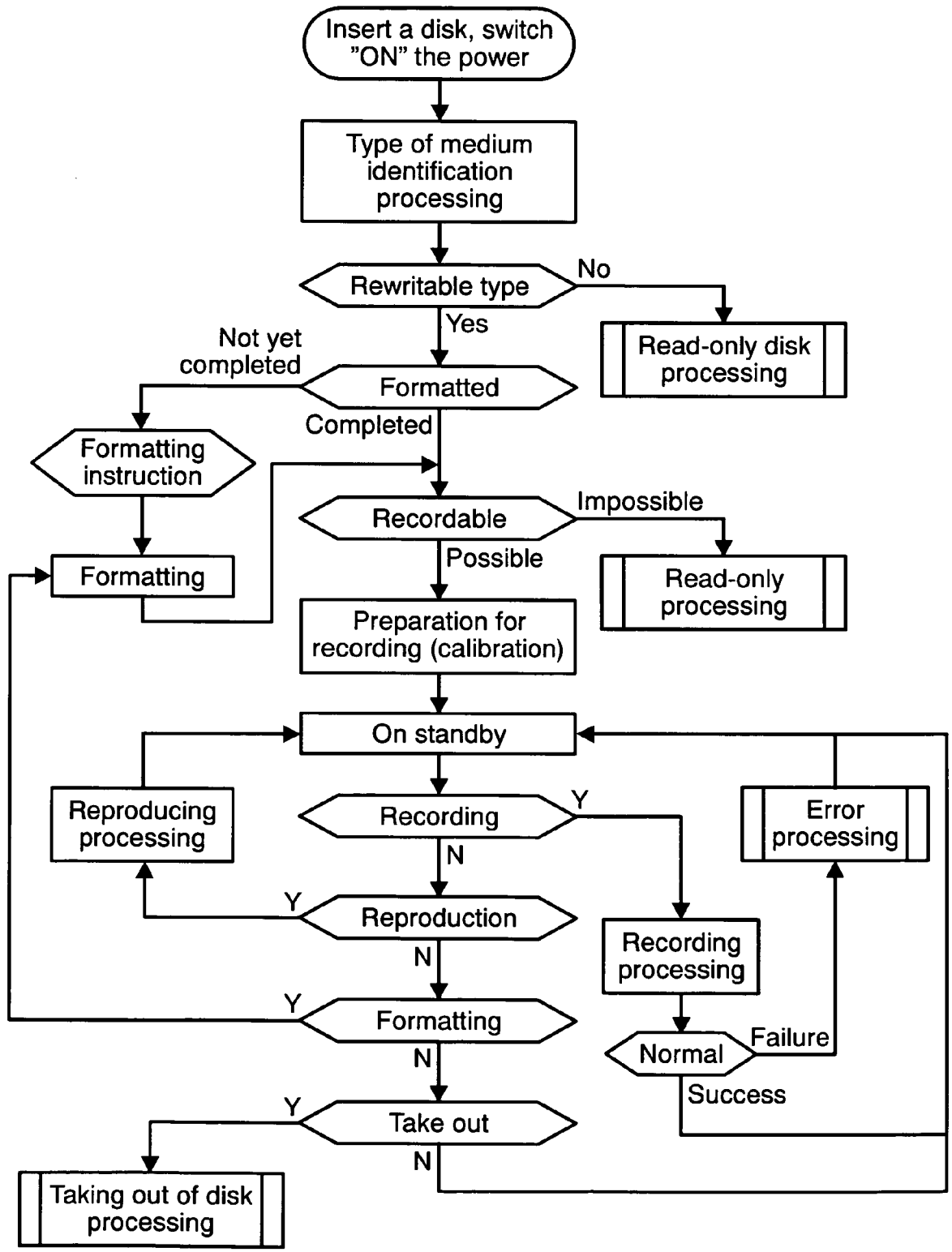
FIG. 5 is a flowchart showing the operation of the optical disk recording/reproducing system.

FIG. 5 is a flowchart showing an example of operation of an optical disk recording/reproducing apparatus shown in FIG. 4 for driving a DVD-RAM disk.

When an optical disk 11 is inserted, or when the optical disk recording/reproducing apparatus is switched on, the optical disk recording/reproducing apparatus start in the first place the medium distinction processing for distinguishing the type of optical disk 11. Ordinarily an optical disk recording/reproducing apparatus adapted to the recording/reproducing DVD-RAM has the reproducing function of CD-ROMs or DVD-ROMs which are read-only mediums in addition to the DVD-RAM medium. Therefore, the optical disk recording/reproducing apparatus starts by distinguishing the type of medium to identify to which of the type mentioned above the medium falls into. And the method of this distinction processing differs depending on each optical disk recording/reproducing apparatus. For example, an apparatus distinguishes the type of optical disk 11 by the analog property of reproduced signals such as the reflection ratio of the optical disk or focusing error signals, or distinguishes the type of the medium by the contents (data) of the signals reproduced in the physical information storage area of the medium created on the optical disk 11.

Upon determining that the type of the medium is a rewritable one, in other words DVD-RAM, the optical disk recording/reproducing apparatus inspects the contents recorded in the defect control information area and determines whether the optical disk has been physically formatted. If the optical disk has not been physically formatted, the optical disk recording/reproducing apparatus stands ready until a command is given by the apparatus of the higher order 9 to start a physical formatting.

When the optical disk has been physically formatted, the optical disk recording/reproducing apparatus 11 stands ready waiting for a command from the apparatus of the higher order 9 after performing a round of preparatory processing for recording including as calibration operation and the certification of logical conformity. Upon receiving any command for processing, the apparatus checks the type of the command for processing, and if it is a command for recording processing, the apparatus records the user data, and in the case of a command for processing such as pulling out a reproducing or formatted disk, it carries out a processing respectively corresponding thereto. Normally, this processing is completed regularly. However, in the case of a failure to record for any unforeseeable reason, an error recovery processing including retries and replacement processing will be carried out.

Normally, in the case of a DVD-RAM, for this recording processing, the reliability of data recorded on the medium is enhanced by actually reproducing the user data from the optical disk 11 in order to certify whether the user data have been properly recorded, and when necessary by carrying out a replacement processing of using a different recording unit area. The information relating to the reallocation of recording area due to the replacement processing is recorded as a defect management table consisting of a plurality of defect lists in the defect management area on the recording medium. However, in the streaming recording wherein real-time feature is required for recording processing as in the case of video recording and the like, the certification processing of recorded data is not performed because no time is available for reproducing processing, retry or replacement processing for certification immediately after recording.

In the formatting processing, certification processing is carried out in response to the desire of the apparatus of the higher order 9. Certification processing enables to ensure that data will be recorded by avoiding defective positions in the streaming recording by detecting in advance defects on the optical disk before the user data are recorded on a DVD-RAM. Immediately after dummy data such as 00h and the like (hereinafter referred to as "certification data") are recorded in the whole data area of the optical disk 11, this certification processing reads the certification data actually recorded from the optical disk, examines the number of errors included in the reproduced data, and distinguishes whether they are defective or not by determining whether they have exceeded the threshold value for the number of errors that has been set in advance for the judgment of defects. And the recorded areas in the data area judged as defective during this processing are added to the defect list of the defect management table in the same way as the defects detected during the recording processing. According to the description of the present invention, the defects detected by the certification processing at the time of formatting are registered as defects for the replacement processing in the spare area in the same way as the results detected during the recording processing. In other words, the detected defective areas are not correlated with the logical address, and the slipping processing for slipping the relationship between the physical address and the logical address around the defects is not presumed.

Now, we will describe below the details of the codification process from user data to recorded data at the time of recording dealt here with reference to FIG. 2 and FIG. 3.

Figure 2:
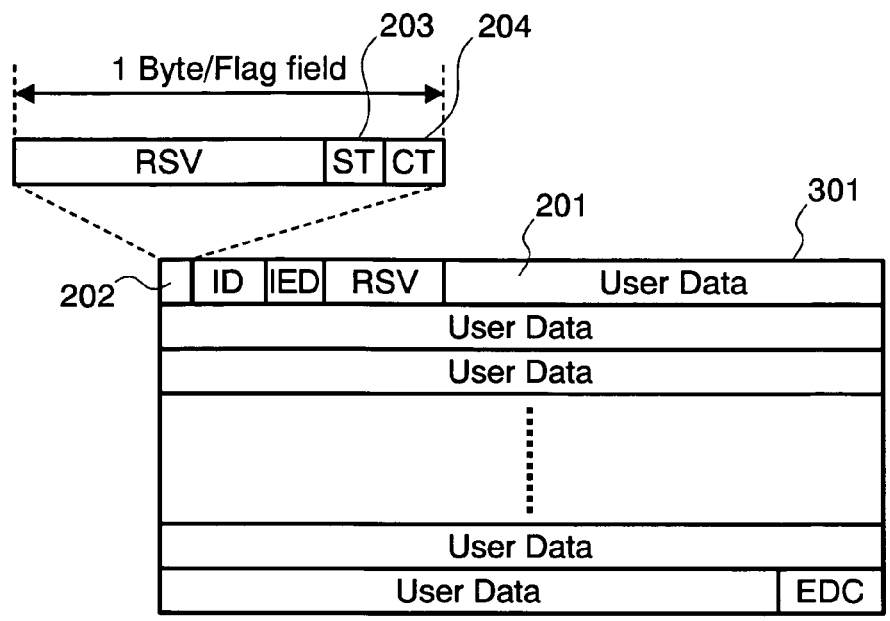
FIG. 2 is a descriptive illustration showing the structure of a data frame.

FIG. 2 shows an example of the constitution of a data frame 301. The data frame 301 is a column of data wherein user data 201 and the information data for managing the user data 201 are combined. The user data 201 consisting of 2,048 bytes inputted by the apparatus of the higher order 9 are followed by a flag field 202 showing the attribute of a data of 1 byte, a data identification code (ID) of three bytes for identifying data, an IED of two bytes representing a code for detecting errors of ID, and a RSV of six bytes representing a spare data area. And this column of data ends with an error detecting code EDC of four bytes for detecting errors contained in the data and as a result constitutes a data frame 301 of 2,064 bytes. Each data frame 301 is constituted by 12 lines, each line being constituted by 172 bytes. The flag field 202 includes an ST flag 203 indicating data recorded by streaming recording requiring a guarantee of a transfer rate and a CT flag 204 indicating certification data recorded for certification at the time of formatting.

Figure 3:
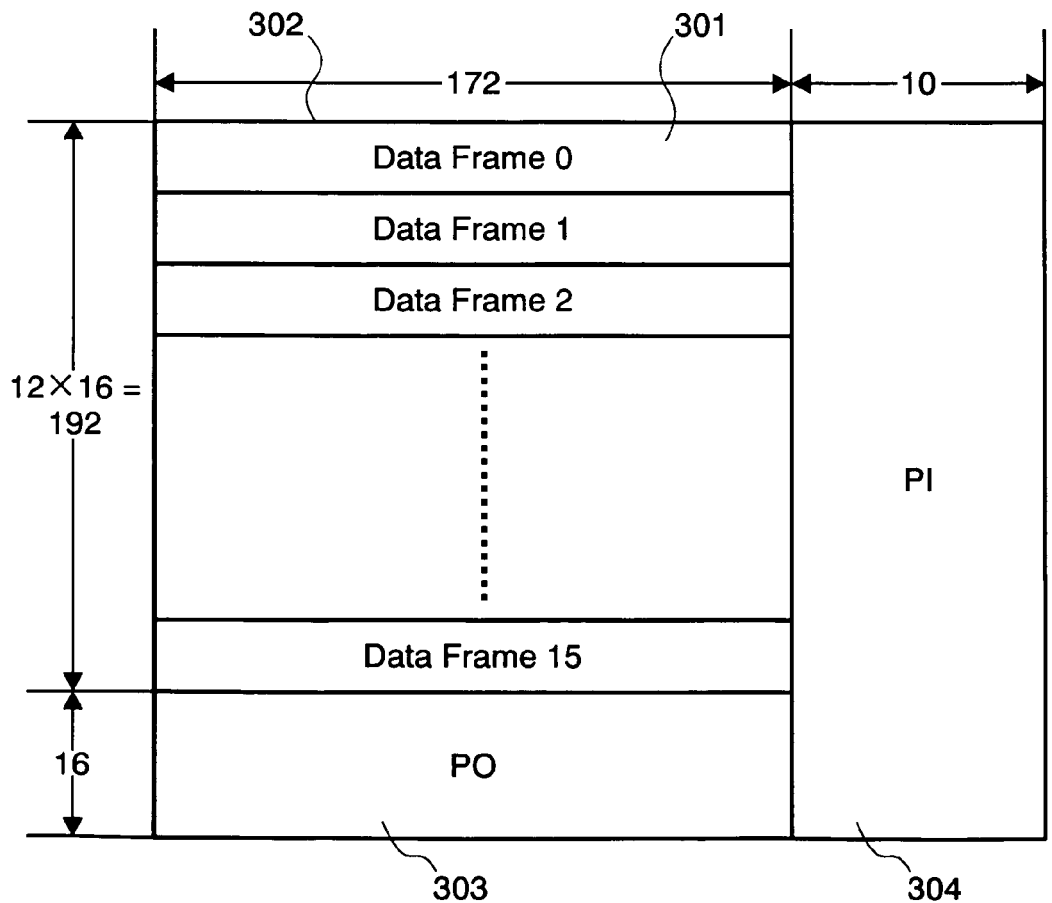
FIG. 3 is a descriptive illustration showing the structure of an ECC block.

FIG. 3 shows the constitution of the ECC block 302. Normally, this ECC block 302 constitutes the data unit for recording/reproduction of the optical disk recording/reproducing apparatus. The ECC block 302 is constituted by 16 data frames 301, a parity outer (PO) 303 and a parity inner (PI) 304. The data frame 301 shown in FIG. 3 constituted by scrambling the data frame 301 shown in FIG. 2 has the same data size. Therefore, the data frame 301 shown in FIG. 3 and the data frame 301 shown in FIG. 2 are constituted by 172 bytes×12 lines. The assemblage of 16 such data frames 301 results in the formation of 12 lines×16=192 lines in the vertical direction. In addition, a parity outer (PO) 303 of 16 bytes is added to each vertical row resulting in the formation of 208 (=192+16) lines in the vertical direction. A parity inner (PI) 304 of ten bytes is added to each extended vertical line of data resulting in the formation of data of 182 (=172+10) bytes in the horizontal direction. Thus, the ECC block 302 will be constituted by 182 bytes×208 lines as shown in FIG. 3.

Thus, the microprocessor 7 shown in FIG. 4 records data on the optical disk 11 by means of a laser driver 51 after forming the ECC block 302 and carrying out a frequency modulation in order to limit the frequency components contained in the data as the final processing for coding.

In an apparatus wherein replacement processing is carried out such as the optical disk recording/reproducing apparatus of a DVD-RAM, at the time of recording processing of user data 201, it is confirmed whether data have properly been recorded on the optical disk 11 by reproducing the data on the optical disk 11 immediately after the data have been recorded, and by comparing these reproduced data with the user data remaining on the memory 8, or by detecting the number of errors contained in the reproduced data after making a correction processing of errors. When it is judged as a result that the data have not been properly recorded at this position, the recording at the same positions (addresses) is repeated, and when it is judged that nevertheless the data have not been properly recorded, in other words that this position is a defective area, replacement processing of recording the user data 201 remaining in the memory 8 in a spare area is to be carried out.

Normally, this replacement processing is carried out by the ECC block 302, a recording/reproducing unit shown in FIG. 3. In the data format described in FIG. 2 and FIG. 3, a data identification code (ID) is added to each data frame 301, and therefore there will be a multiple of 16 of data identification code at the top of the ECC block 302, and they are correlated with the logical address essentially in blocks of this data frame 301. However, in order to facilitate the description of the present invention, the last four bits of the data identification code (ID) are ignored, a physical address is allocated to the ECC block 302, and a logical address is correlated with this physical address for the description of the present invention. Accordingly, in this description the data unit of recording processing commands and reproducing processing commands given by the apparatus of the higher order 9 are shown in the ECC blocks 302. However, it is possible to obtain the effects of the present invention without being limited by the physical address unit corresponding to the logical address or the minimum data unit for recording/reproducing processing.

FIG. 6 shows the relationship between the physical addresses on the optical disk 11 divided into areas by their object and the logical addresses contained in the recording/reproducing processing commands given by the apparatus of the higher order. The optical disk 11 is logically divided into the lead-in 601, the data area (area combining 602 and 603), and lead-out 604. And here the case wherein the data area is logically divided into the user area 602 and the spare area 603 for the management of defects is shown as an example. The starting physical addresses of the lead-in 601 and the data area 602 are respectively A and B, and the ending physical address of the lead-out 604 is C. And although there are cases where A>B>C depending on the physical address specification of the optical disk 11, in this description we will assume that the relationship of A<B<C is valid. In this case, as the initial status, the logical address is allocated only to the user area 602, and in the absence of replacement a physical address B+n is correlated with a logical address n. However, in the case where B+n is allocated to another address as the object of replacement, the physical address to which the replacement was carried out corresponds to the logical address n. Therefore, if the ending address of the user area 602 is B+a, the logical address space available for determining the presence of any defects is from zero to a.

FIG. 7 is a schematic illustration of a writable optical disk 11 for describing schematically the management of defects by the linear replacement method generally used, and the optical disk 11 is logically divided into various areas depending on the objects similar to those shown in FIG. 6. The defect management information area (DMA, area combining 701 and 702) in the lead-in 601 stores the split-up information of the data area, the disk definition structure information (DDS) 701 including information on the logical structure relating to the candidate addresses used next in the spare area 603, and a defect management table (DLT) 702 including a plurality of defect lists (DL) showing the correspondence between the defect addresses in the user area and the replacement addresses in the spare area 603 used as the addresses of their replacement. And the spare area 603 disposed on the outer circumference side of the user area 602 is used consecutively from the lead-out 604 in the direction of the lead-in 601.

FIG. 8 shows in details the structure of the DL 804 used for the management of defects. Each DL 804 is constituted by the defect addresses in the user area 602, the replacement addresses in the spare area 603 allocated by the linear replacement method and the status information showing the relationship between these two addresses. In the figure, the area smeared completely black on the optical disk 11 represents a recorded area 801. In this status, in other words when it has been judged that the address N802 of the user area 602 is defective after the recorded area 801 smeared completely black has been recorded, the user data 201 demanded to be recorded at the address N802 by the apparatus of the higher order is recorded in replacement at an unused address M803 of the spare area. The DL 804 is constituted by "replacements" that show the relationship between two addresses, "address N" and "address M" in order to show this information. However, if the data recorded in the recorded area 801 are streaming data that require the guarantee of a fixed transfer rate for recording/reproduction, it some times becomes impossible to process data for the judgment of defects depending on the transfer rate at the time of recording, and even if a linear replacement method can be put in practice, it often becomes impossible to transfer data to the spare area 603 for replacement or to reproduce data at the time of reproduction. For this reason, normally the registration of information that the address is defective does not automatically result in a linear replacement operation even if a defect is detected. Accordingly, in this description the DL 804 showing the defect information that no such replacement into the spare area 603 has been made but a linear replacement operation may be made when required is constituted by "the address N," "0000_0000h (the corresponding address is not defined) and "a defect" showing the relationship between the two addresses.

FIG. 9 shows an example of the data structure of the DDS 701 including the information showing the status of certification processing disposed in the DMA. Between the bytes 0-1 is disposed an identifier "DS" identifying the DDS 701, between the bytes 2-3 is disposed a DDS update counter increasing zero for the first DDS prepared at the time of disk formatting and increasing by one every time the DDS 701 is renewed, between the bytes 4-7 are recorded valid DLT addresses showing the addresses within the DMA wherein valid DLT 702 is recorded, and between the bytes 8-11 is disposed the space area size specifying the number of ECC blocks constituting the spare area 603 secured in the data area, between the bytes 16-19 is disposed the certification status showing the progress of certification, and between the bytes 20-23 are disposed the certified addresses showing the addresses whose certification processing has been completed. The certification processing of the present invention is successively carried out from the inner circumference of the optical disk 11, in particular from the top address to the end address of the user area 602 in accordance with the formatting command given by the apparatus of the higher order 9. Accordingly, this certification status is used to show the three statuses of the certification processing not yet performed, the certification processing now in progress and the certification processing completed, and the certified addresses are used to show the addresses up to the point where the certification processing has been completed during the progress of the certification processing for the certification status.

FIG. 10 shows an example of the data structure of the DLT 702 disposed in the DMA. Between the bytes 0-1 is disposed an identifier "DL" for identifying the DLT 702, between the bytes 2-3 is disposed a DLT update counter increasing by zero for the first DL prepared at the time of disk formatting and increasing by one every time the DLT 702 is renewed thereafter, and between the bytes 8-11 are disposed the number of DL having defective status or replacement status and constituting the DLT 702, and over eight bytes after the byte 16 are disposed a plurality of DL 804 constituted by status, defective addresses and replacement addresses.

Figure 11:
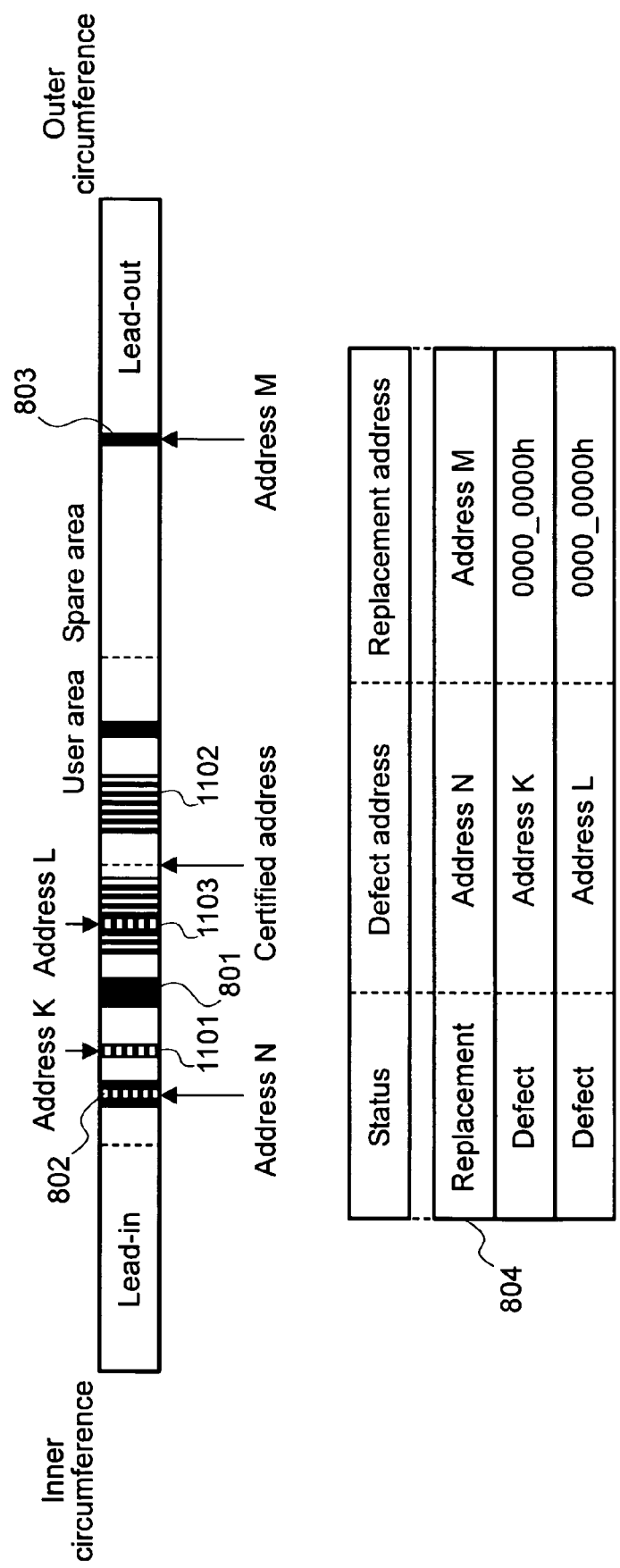
FIG. 11 is a descriptive illustration showing the status of an optical disk being processed for certification.

FIG. 11 is an illustration showing an example of the status of an optical disk 11 subjected to certification processing capable of accepting recording processing during the processing according to the present invention. In the figure, the area smeared totally black on the optical disk 11 represents a recorded area 801, and the area covered by oblique lines represents a recorded area 1102 recorded by streaming recording. The address M803 in the spare area 603 shows that it was used as the replacement address of the address N, the address K1101 shows a defective address detected by the certification processing, and the address L1103 shows a defective address detected during recording in the recorded area recorded by the streaming recording. The DL 804 is constituted by "the address N," "the address M" and "the replacement" showing the relationship between these two addresses to show this information. With regards to "the address L" whose defect was detected during a streaming recording, "the address L" as defective address, "0000_0000h (the corresponding address is not yet defined) as the replacement address thereof, and the information called "defect" showing the relationship between the defective address and the replacement address are registered in the DL 804, and the DLT 702 is also registered. With regards to "the address K" whose defect was detected during certification processing also, "the address K" as defective address, "0000_0000h (the corresponding address is not yet defined) as the replacement address thereof, and the information called "defect" showing the relationship between the defective address and the replacement address are registered in the DL 804, and the DLT 702 is also registered. The defective addresses registered in this DL 804 are allocated to the addresses in the spare area 603 at the time of recording other than the next streaming recording for recording processing at the replacement addresses.

FIG. 1 is a flowchart showing the certification processing operation of the present invention. The optical disk recording/reproducing apparatus receives a command given by the apparatus of the higher order 9, and if the command turns out to be one that instructs the certification of disk (certification), the apparatus sets "the certification processing ongoing" for the certification status of the DDS 701 and resets the certified addresses. Then, the apparatus records the certification data carrying a CT flag 204 without certification processing from the top of the data area through the end of the data area. After the data for certification have been recorded over the whole data area, the certification processing of the recorded data including the certification data starts. This certification processing is a processing wherein the certification data actually recorded are read again from the data area of the optical disk 11 and the number of errors contained in the reproduced data is examined. And as soon as this certification processing of the recorded data starts, the optical disk recording/reproducing apparatus becomes ready to receive commands given by the apparatus of the higher order 9. In the absence of commands from the apparatus of the higher order 9, and when the optical disk recording/reproducing apparatus is on standby or is idle, the apparatus confirms the certification status of the DDS 701, and upon finding that the certification processing is going on, the apparatus starts certification processing from the address following the certified address. However, if the certified address has a reset value, the certification processing starts from the top of the data area. The certification processing is carried out at least in the ECC blocks 302, and when the scheduled certification processing of several ECC blocks has been completed, the apparatus confirms again whether a command has been received from the apparatus of the higher order 9. And when it is judged again that no command has been received from the apparatus of the higher order 9 and that the apparatus is on standby, the apparatus starts again a certification processing. At this time, when the number of ECC blocks 302 whose certification processing has been completed exceeds a predetermined number, the records of the DDS 901 including certified addresses are renewed. The object of this renewal is to prevent the loss of the address information whose certification processing has been completed, necessitating the repetition of other certification processing from the top of the data area, in the case where a command is received from the apparatus of the higher order 9 during certification processing and power is cut off during other processing resulting in an unexpected disruption of the operation of the optical disk recording/reproducing apparatus. However, when the DDS 701 is renewed in blocks of certification processing unit for confirming the receipt of processing commands from the apparatus of the higher order 9, in other words in blocks of 1 to several ECC blocks, the time required for certification processing will be longer and the number of rewriting of the DDS 701 increases resulting in degradation of the quality of records in the DMA. Therefore, the question of whether the renewal of the DDS is necessary or not is judged by the timing of confirming the commands from the apparatus of the higher order 9. We will now describe the operation when the processing commands are received by the timing of confirming the reception of commands from the apparatus of the higher order 9. When the processing command given by the apparatus of the higher order 9 is one that instructs recording, the user data 201 transferred from the apparatus of the higher order 9 are recorded at the predetermined address on the optical disk 11 corresponding to the logical address contained in the recording processing command. When this recording is a streaming recording, as described above, the certification processing and replacement processing at the time of recording are avoided, and the recording is made by adding the ST flag 203 showing that the streaming recording is made in the flag field 202 at the time of modulation processing of the recording data. If the recording is a normal recording, immediately after the user data 201 have been recorded, the data recorded on the disk 11 are reproduced, and the demodulated data from this reproduced data and the user data 201 remaining in the memory 8 are compared, or errors are corrected to detect the number of errors contained in the reproduced data and to confirm whether recording has normally been made on the optical disk 11. If it is judged that no normal recording has been made, the recording at the same position (address) is repeated, and if it is judged nevertheless that no normal recording has been made at this position, in other words that this position is defective, a replacement processing will be made by recording the user data 201 remaining in the memory 8 in the spare area 603. In other words, the ST flag 203 contained in the recording data indicates the attribute of the data and shows at the same time whether the certification processing has been made or not for judging whether the recording was correctly made at the time of recording.

The certification processing command shown in the figure is normally executed as a partial function contained in the disk formatting processing command. However, in this description the certification processing command is treated for the sake of convenience as processing instructed individually from the apparatus of the higher order. However, the effect of the present invention can be obtained even if the certification processing command is given in the form contained in the disk formatting procession command.

We will describe below in details the certification processing performed according to a certification processing command shown in FIG. 1 with reference to FIG. 12, FIG. 13, FIG. 14 and FIG. 15.

Figure 12:
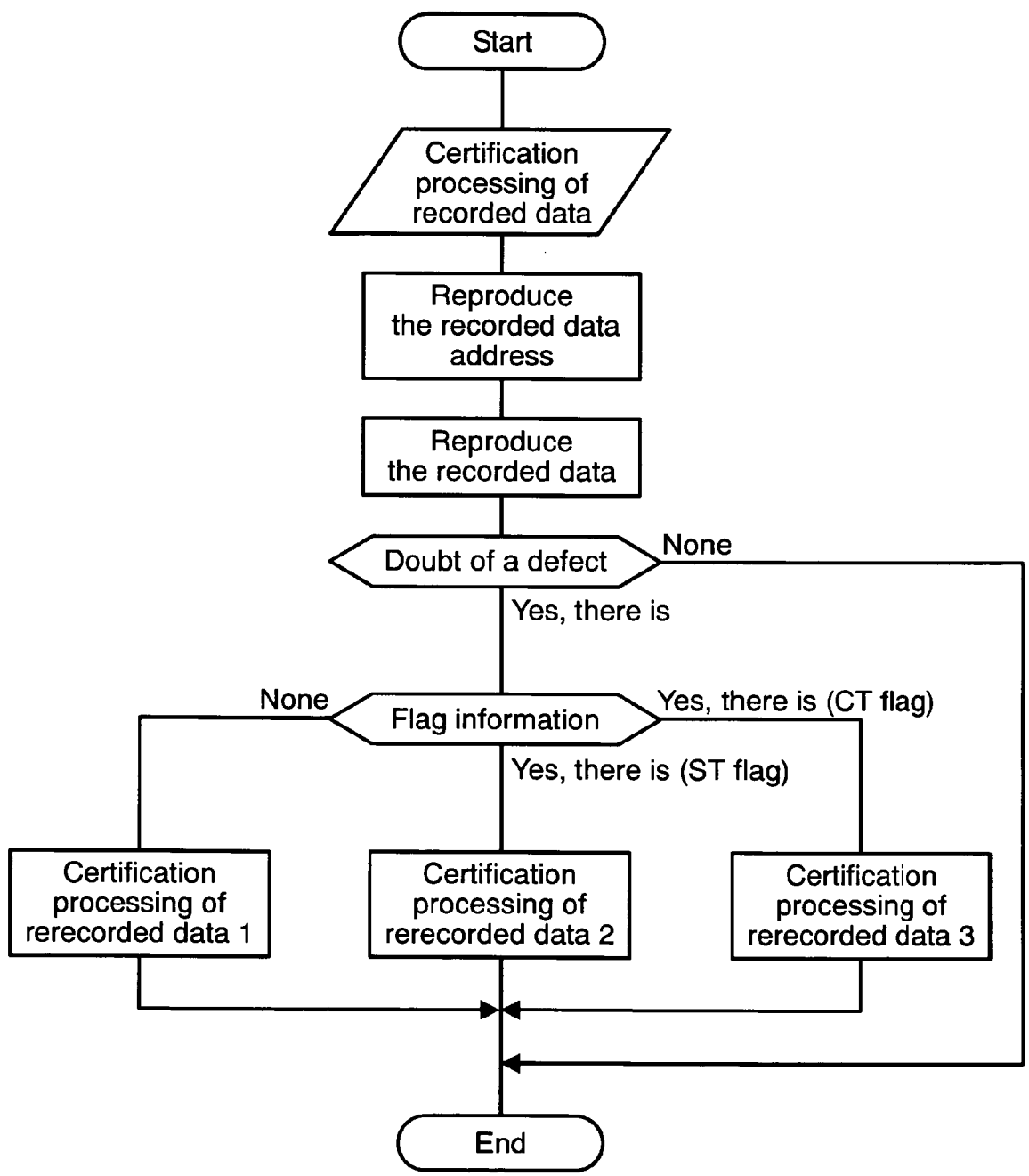
FIG. 12 is a flowchart showing the operation of certification processing of recorded data.
Figure 13:
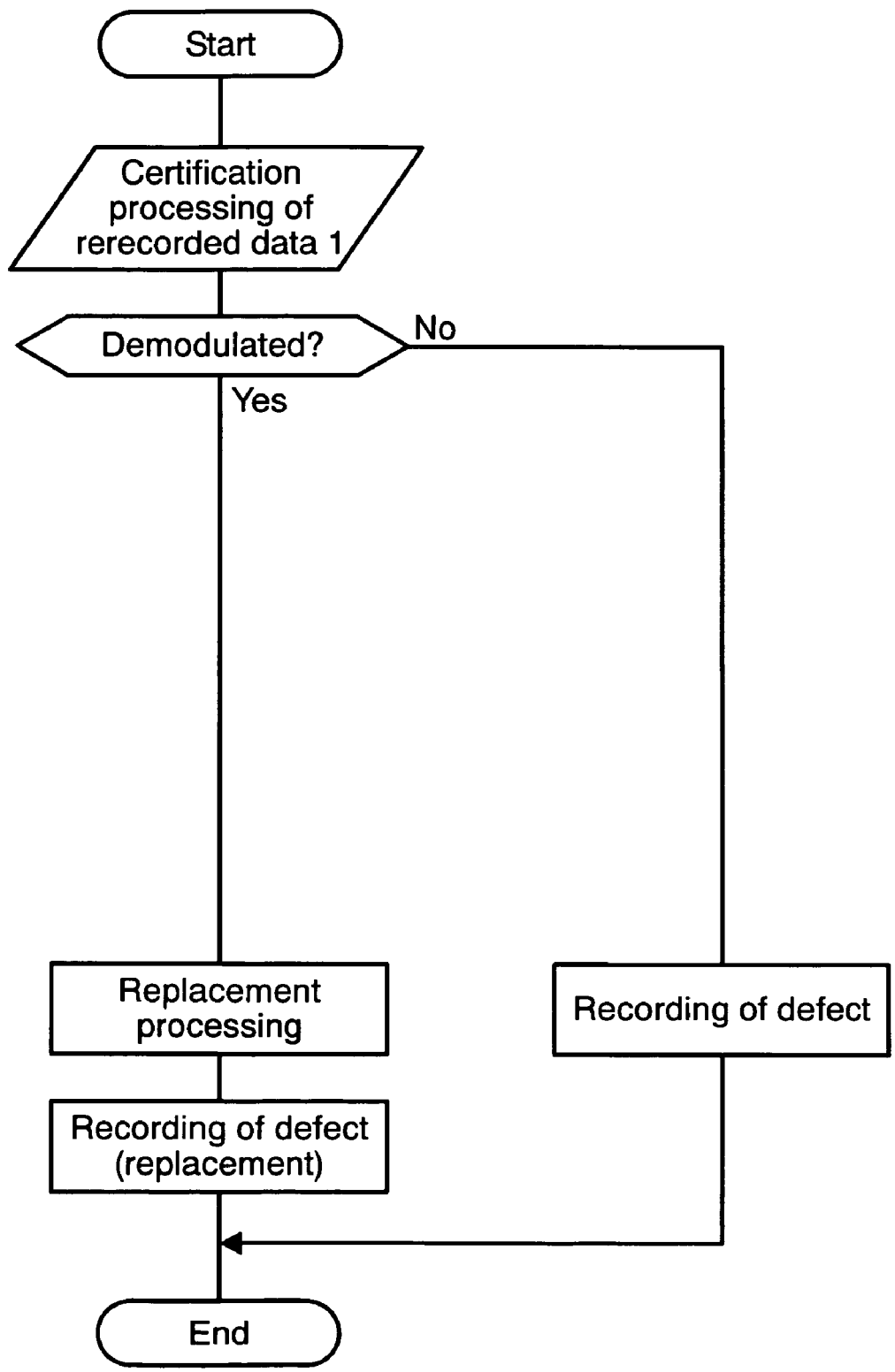
FIG. 13 is a flowchart showing the Operation 1 of certification processing of rerecorded data.

FIG. 12 is a flowchart showing the certification processing of recorded data. The certification processing of recorded data starts first of all with the reproduction of various addresses including the flag field 202 and the IED of the recorded data subject to certification. This is followed by an error correction processing carried out in the form of ECC blocks 301 including user data 201, wherein the number of errors contained in the ECC blocks 301 is sought. When the number of errors is less than the predetermined number of errors for the judgment of defects, the certification processing of the recorded data is terminated with a judgment that there is no potential defect. When the number of errors is in excess of the predetermined number of errors for the judgment of the set number of defects, the area is suspected of being defective, the flag added to the flag field 202 at the top of each data sector of the recorded data is analyzed, and the certification processing of different rerecorded data is to be carried out depending on the type of the flag. When the flag cannot be analyzed, further recording is impossible and the whole process is terminated.

When, as a result of an analysis of the flag added to the flag field 202, the ECC block 301 is judged to be data recorded without a ST flag 203 and a CT flag 204 added thereto, it is judged as recorded data normally recorded before the certification processing but is judged as having become a defective area anew after the recording, and the certification processing of the rerecorded data 1 shown in the flowchart 13 is carried out. In the certification processing of the rerecorded data 1, the subsequent processing is switched depending on whether the reproduced recording data could be correctly demodulated or not. If the data could not be correctly demodulated, the data cannot be rerecorded, the processing is terminated after the defect is registered in the DLT 702. If the data could be demodulated, the demodulated data is rerecorded at the replacement address in the spare area 603 after the address of the demodulated data is changed to the replacement address in order to perform replacement processing to the spare area 603, and after DL 804 wherein this replacement processing is shown is registered in the DLT 804, the certification processing of the rerecorded data is terminated.

Figure 14:
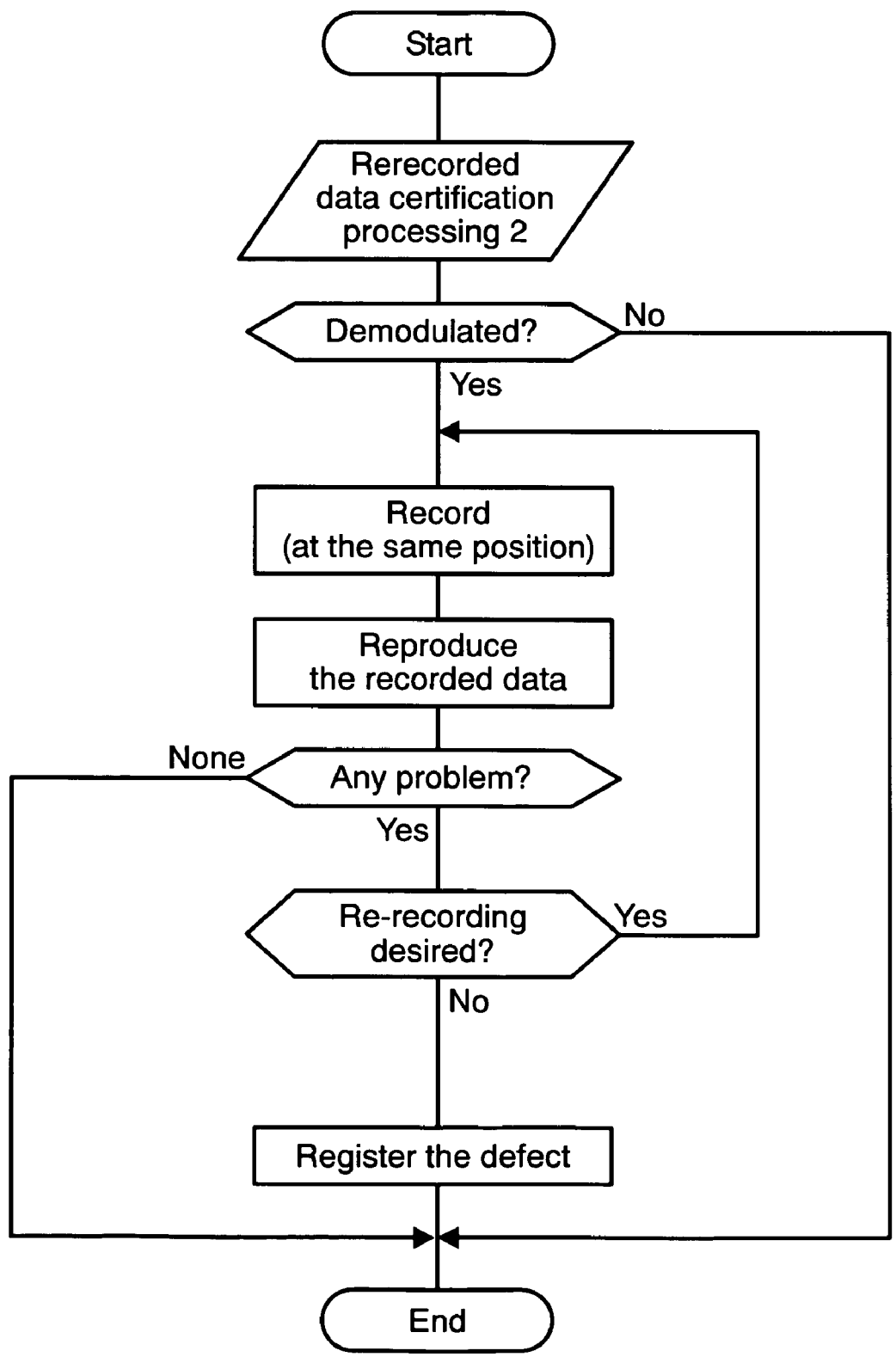
FIG. 14 is a flowchart showing the Operation 2 of certification processing of rerecorded data.

If the ECC block 301 is judged as streaming recording data to which an ST flag 203 has been added as a result of an analysis of the flag added to the flag field 202, no certification processing of data is carried out at the time of recording and no guarantee is made on the quality of recording of data, and therefore the rerecorded data certification processing 2 shown in the flowchart of FIG. 14 is carried out. In the rerecorded data certification processing 2, the subsequent processing is switched depending on whether the reproduced recorded data could be correctly demodulated. If the data could not be correctly demodulated, the processing is terminated judging that the streaming recording was not performed with a good quality. If the data could be demodulated, the demodulated data are recorded repeatedly at the same position as required in the same way as the certification processing performed at the time of recording of normal data recorded not by streaming recording. If the number of errors contained in the recorded data is reduced to less than the number of errors for the judgment of defects as a result of a rerecording, the certification processing of the recorded data is terminated judging that there is no suspected defect, and if the number of repeated recording in excess of a predetermined number is still judged as defective, the rerecorded data certification processing is terminated after a DL 804 showing that the area is defective has been registered in the DLT 702.

Figure 15:
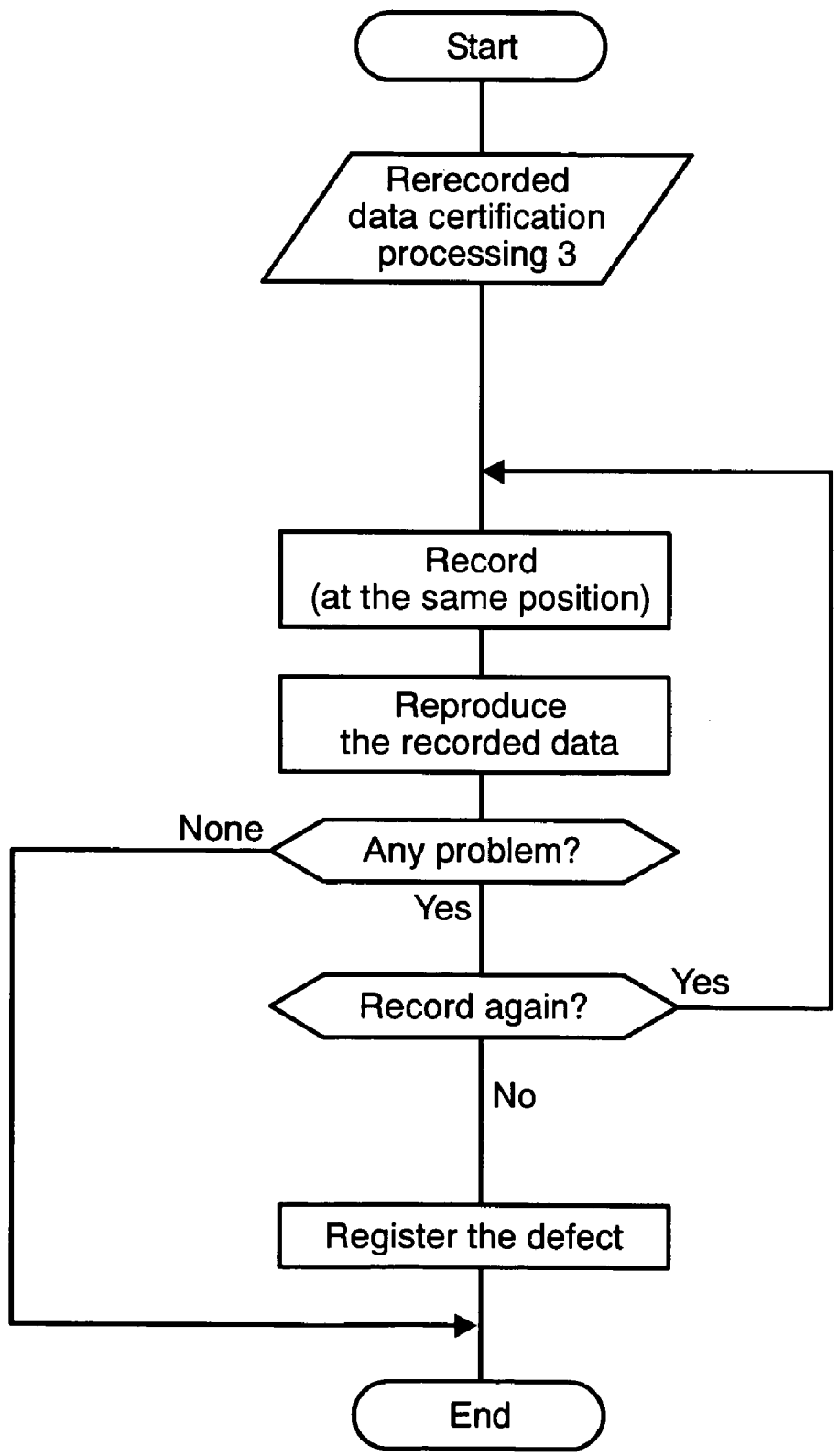
FIG. 15 is a flowchart showing the Operation 3 of certification processing of rerecorded data.

If the ECC block 301 is judged as certification data recorded with a CT flag 204 added thereto as a result of an analysis of the flag added to the flag field 202, the certification processing of the data is not performed at the time of recording and therefore no guarantee is given on the quality of recording of the data. As a result, the rerecorded data certification processing 3 shown in the flowchart of FIG. 15 is carried out. As the user data 301 used for the certification data are meaningless, or as they are specified in advance as specific patterns, this processing need not be switched by the result of demodulation of the certification data. The certification data are repeatedly recorded at the same position as required in the same way as the certification processing at the time of data recording when a recording processing command is received from the apparatus of the higher order. If the number of errors contained in the recorded data has been reduced to less than the number of errors for the judgment of defect as a result of repeated rerecording, the certification processing of the recorded data is terminated by judging that this error has occurred as a result of an insufficient recording control and not because of a defect of the recording area. If the number of errors does not fall below the number of errors for the judgment of defect even if a predetermined number of recording has been repeated, and the area is judged as defective, the rerecorded data certification processing is terminated after a DL 804 showing that this area is defective has been registered in the DLT 702.

Figure 16:
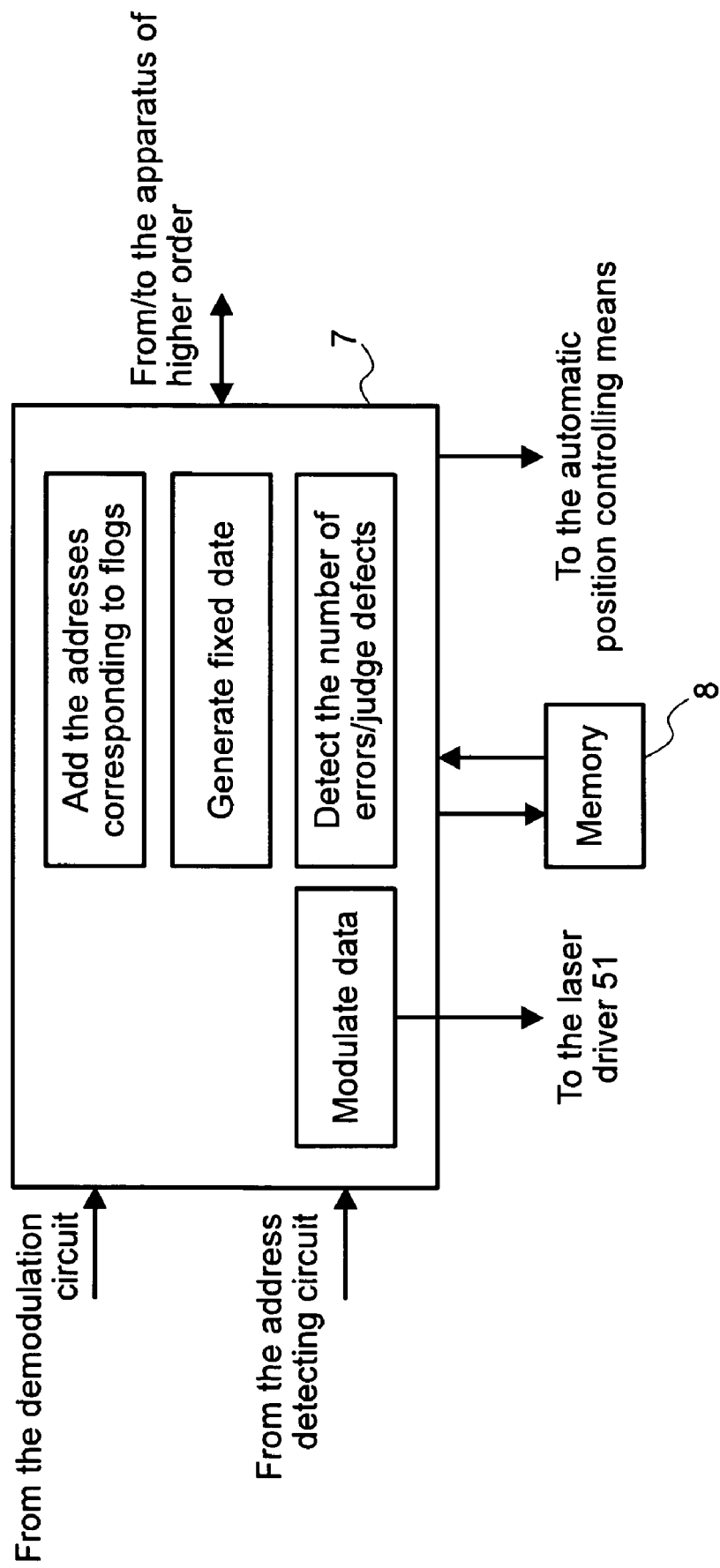
FIG. 16 is an illustration showing the structure of the microprocessor of the optical disk recording/reproducing apparatus.

The structure of the digital data recording apparatus for realizing the present invention is similar to the structure of the optical disk recording/reproducing apparatus shown in FIG. 4. FIG. 16 shows an example of the structure of microprocessor shown in FIG. 4. The recording processing including rerecording shown in FIG. 1, FIG. 12, FIG. 13, FIG. 14 and FIG. 15 is carried out in the same way as the recording of user data transferred from the apparatus of the higher order 9 together with the recording processing command. However, the type of data recorded on the optical disk 11 may be modulated data after the replacement of address corresponding to the rerecording position in the memory 8 of the demodulated data read out from the optical disk 11, or modulated data after the automatic generation of fixed data in the memory 8 by the microprocessor 7. The processing of adding an ST flag 203 at the top flag field 202 of the data frame 301 from the streaming recording command information contained in the recording procession command and the processing of adding a CT flag 204 added to the certification data for certification processing as well as the addition of addresses in the data frames can be easily realized by the microprocessor 7. In this description, we use an optical disk recording/reproducing apparatus for the transformation by the microprocessor 7 of user data 201 stored in the memory 8 into data frames 301, the transformation of the same into ECC brocks 302, and for demodulation processing. However, the present invention can be used equally in an apparatus wherein a signal modulation block similar to the signal reproduction block 41 is provided separately.

As described above, the switching of the certification processing depending on the result of analysis of the flag added to the flag field 202 enables to provide a digital data recording method and recording/reproducing apparatus capable of accepting the recording demand of normal user data and streaming data sent from the host computer at the same time as the execution of the certification.

What is claimed is:

1. A digital data recording method of rewritable optical disks including certification processing, comprising:
 a first step of recording certification data for the certification processing on the optical disk;
 a second step of recording user data different from the certification data on the optical disk after the first step;
 a third step of reproducing the data recorded in the first step or the second step after the second step; and
 a fourth step of recording the certification data at the same position again when the data reproduced in the third step includes the certification data recorded in the first step and the data reproduced in the third step has a defect.

2. The digital data recording method according to claim 1, wherein the user data include real-time streaming data, and unreal-time data.

3. The digital data recording method according to claim 2, wherein the certification data comprise an identification flag, and the identification flag is used to judge whether the data reproduced in the third step are the user data or not.

4. The digital data recording method according to claim 2, wherein the certification processing is switched depending on whether the user data could be correctly demodulated or not if the data reproduced in the second step turns out to be the user data as a result of reproduction in the third step.

5. The digital data recording method according to claim 2, wherein the certification data comprise an identification flag, and the identification flag is used to judge whether the data reproduced in the third step are the certification data, the real-time streaming data, or the unreal-time data.

6. The digital data recording method according to claim 2, further comprising a fifth step of recording the user data at the same position again when the data reproduced in the third step includes the real-time streaming data and data reproduced in the third step has a defect although the data can be reproduced correctly.

7. The digital data recording method according to claim 1, wherein the certification data comprise an identification flag, and the identification flag is used to judge whether the data reproduced in the third step are the user data or not.

8. The digital data recording method according to claim 1, wherein the certification processing is switched depending on whether the user data could be correctly demodulated or not if the data reproduced in the second step turns out to be the user data as a result of reproduction in the third step.

9. A digital data recording/reproducing apparatus for carrying out certification processing on rewritable optical disks, comprising:

a laser diode for emitting laser beams;

a laser diode driving unit for driving the laser diode;

a controlling unit for controlling the laser diode driving unit, wherein the controlling unit controls the laser diode in order to carry out:

a first step of recording the certification data for the certification processing on the optical disk, a second step of recording user data different from the certification data on the optical disk after the first step, a third step of reproducing the data recorded in the first step or the second step after the second step, and a fourth step of recording the certification data at the same position again when the data reproduced in the third step includes the certification data recorded in the first step and the data reproduced in the third step has a defect.

10. The digital recording/reproducing apparatus according to claim 9, wherein the user data include real-time streaming data and unreal-time data.

11. The digital data recording/reproducing apparatus according to claim 10, wherein the certification data comprise an identification flag, and the identification flag is used to judge whether the data reproduced in the third step are the user data or not.

12. The digital data recording/reproducing apparatus according to claim 10, wherein the certification processing is switched depending on whether the user data could be correctly demodulated or not if the data reproduced in the second step turns out to be the user data as a result of reproduction in the third step.

13. The digital data recording/reproducing apparatus according to claim 10, wherein the certification data comprise an identification flag, and the identification flag is used to judge whether the data reproduced in the third step are the certification data, the real-time streaming data, or the unreal-time data.

14. The digital data recording/reproducing apparatus according to claim 9, wherein the controlling unit controls the laser diode in order to carry out a fifth step of recording the user data at the same position again when the data reproduced in the third step includes real-time streaming data and the data reproduced in the third step has a defect although the data can be reproduced correctly.

15. The digital data recording method according to claim 9, wherein the certification data comprise an identification flag, and the identification flag is used to judge whether the data reproduced in the third step are the user data or not.

16. The digital data recording method according to claim 9, wherein the certification processing is switched depending on whether the user data could be correctly demodulated or not if the data reproduced in the second step turns out to be the user data as a result of reproduction in the third step.

\* \* \* \* \*

UNITED STATES PATENT AND TRADEMARK OFFICE
CERTIFICATE OF CORRECTION

PATENT NO.        : 7,782,729 B2  
APPLICATION NO.   : 11/494624  
DATED             : August 24, 2010  
INVENTOR(S)       : Taku Hoshizawa et al.

Page 1 of 1

It is certified that error appears in the above-identified patent and that said Letters Patent is hereby corrected as shown below:

On the title page of the patent, under section "(73) Assignee", please add
Hitachi – LG Data Storage, Inc., Tokyo (JP)

Signed and Sealed this
Fourth Day of January, 2011

David J. Kappos
*Director of the United States Patent and Trademark Office*